(12) United States Patent
Dutta (10) Patent No.: US 8,131,293 B2
(45) Date of Patent: Mar. 6, 2012

(54) SYSTEMS AND METHODS FOR MOBILITY MANAGEMENT IN OVERLAID MOBILE COMMUNICATIONS SYSTEMS

(75) Inventor: Santanu Dutta, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 0 days.

(21) Appl. No.: 13/102,718

(22) Filed: May 6, 2011

(65) Prior Publication Data

US 2011/0256849 A1    Oct. 20, 2011

Related U.S. Application Data

(60) Division of application No. 12/960,760, filed on Dec. 6, 2010, now Pat. No. 7,974,619, which is a continuation of application No. 10/948,606, filed on Sep. 23, 2004, now abandoned.

(60) Provisional application No. 60/505,526, filed on Sep. 23, 2003.

(51) Int. Cl.
*H04W 4/00* (2009.01)
(52) U.S. Cl. ............... 455/435.1; 455/411; 380/247
(58) Field of Classification Search .............. 455/404.2, 455/405, 406, 407, 408, 410, 411, 421, 427, 455/432.1, 433, 435.1, 552.1, 436, 437, 438, 455/439, 440; 380/247, 248, 250
See application file for complete search history.

(56) References Cited

U.S. PATENT DOCUMENTS

| | | | |
|---|---|---|---|
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |

(Continued)

FOREIGN PATENT DOCUMENTS

EP    0 506 255 A2    9/1992

(Continued)

OTHER PUBLICATIONS

Ayyagari et al., "A satellite-augmented cellular network concept", *Wireless Networks*, Vo. 4, 1998, pp. 189-198.

(Continued)

*Primary Examiner* — Ping Hsieh
(74) *Attorney, Agent, or Firm* — Myers Bigel Sibley & Sajovec, P.A.

(57) ABSTRACT

Communications of a mobile station with a satellite mobile communications system and a terrestrial mobile communications system are coordinated. The mobile station is registered with the terrestrial mobile communications system and, responsive to the registration of the mobile station with the terrestrial mobile communications system, the mobile station is concurrently registered with the satellite mobile communications system. The concurrent registration may include implicitly registering the mobile station with the satellite mobile communications system, e.g., by storing information identifying the mobile station may be stored in a location register of the satellite mobile communications system responsive to the registration of the mobile station with the terrestrial mobile communications system, and maintaining synchronization between the two registrations. Authentication tokens may be pre-generated for quick re-registration with a satellite mobile communications system.

16 Claims, 3 Drawing Sheets

U.S. PATENT DOCUMENTS

| | | | |
|---|---|---|---|
| 5,612,703 A | 3/1997 | Mallinckrodt | |
| 5,619,525 A | 4/1997 | Wiedeman et al. | |
| 5,631,898 A | 5/1997 | Dent | |
| 5,668,875 A | 9/1997 | Brown et al. | |
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,946,619 A | 8/1999 | Kolev | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,195,555 B1 | 2/2001 | Dent | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,339,707 B1 | 1/2002 | Wainfan et al. | |
| 6,373,946 B1 | 4/2002 | Johnston | |
| 6,418,147 B1 | 7/2002 | Wiedeman | |
| 6,449,461 B1 | 9/2002 | Otten | |
| 6,522,865 B1 | 2/2003 | Otten | |
| 6,542,716 B1 | 4/2003 | Dent et al. | |
| 6,628,919 B1 | 9/2003 | Curello et al. | |
| 6,684,057 B2 | 1/2004 | Karabinis | |
| 6,690,798 B1 * | 2/2004 | Dent | 380/248 |
| 6,735,437 B2 | 5/2004 | Mayfield et al. | |
| 6,775,251 B1 | 8/2004 | Wiedeman | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,868,270 B2 | 3/2005 | Dent | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,031,702 B2 | 4/2006 | Karabinis et al. | |
| 7,039,400 B2 | 5/2006 | Karabinis et al. | |
| 7,062,267 B2 | 6/2006 | Karabinis | |
| 7,092,708 B2 | 8/2006 | Karabinis | |
| 7,113,743 B2 | 9/2006 | Karabinis | |
| 7,113,778 B2 | 9/2006 | Karabinis | |
| 7,155,340 B2 | 12/2006 | Churan | |
| 7,174,127 B2 | 2/2007 | Otten et al. | |
| 7,181,161 B2 | 2/2007 | Karabinis | |
| 7,203,490 B2 | 4/2007 | Karabinis | |
| 7,218,931 B2 | 5/2007 | Karabinis | |
| 7,266,101 B2 | 9/2007 | Dorenbosch | |
| 7,295,807 B2 | 11/2007 | Karabinis | |
| 7,340,213 B2 | 3/2008 | Karabinis et al. | |
| 7,418,236 B2 | 8/2008 | Levin et al. | |
| 7,418,263 B2 | 8/2008 | Dutta et al. | |
| 7,421,342 B2 | 9/2008 | Churan | |
| 7,437,123 B2 | 10/2008 | Karabinis et al. | |
| 7,444,170 B2 | 10/2008 | Karabinis | |
| 7,447,501 B2 | 11/2008 | Karabinis | |
| 7,453,396 B2 | 11/2008 | Levin et al. | |
| 7,453,920 B2 | 11/2008 | Churan | |
| 7,454,175 B2 | 11/2008 | Karabinis | |
| 7,457,269 B1 | 11/2008 | Grayson | |
| 7,558,568 B2 | 7/2009 | Karabinis | |
| 7,574,206 B2 | 8/2009 | Karabinis | |
| 7,577,400 B2 | 8/2009 | Karabinis et al. | |
| 7,587,171 B2 | 9/2009 | Evans et al. | |
| 7,593,691 B2 | 9/2009 | Karabinis | |
| 7,593,724 B2 | 9/2009 | Karabinis | |
| 7,593,725 B2 | 9/2009 | Karabinis | |
| 7,593,726 B2 | 9/2009 | Karabinis et al. | |
| 7,596,111 B2 | 9/2009 | Karabinis | |
| 7,599,656 B2 | 10/2009 | Karabinis | |
| 7,603,081 B2 | 10/2009 | Karabinis | |
| 7,603,117 B2 | 10/2009 | Karabinis | |
| 7,606,590 B2 | 10/2009 | Karabinis | |
| 7,609,666 B2 | 10/2009 | Karabinis | |
| 7,620,394 B2 | 11/2009 | Good et al. | |
| 7,623,859 B2 | 11/2009 | Karabinis | |
| 7,623,867 B2 | 11/2009 | Karabinis | |
| 7,627,285 B2 | 12/2009 | Karabinis | |
| 7,634,229 B2 | 12/2009 | Karabinis | |
| 7,634,234 B2 | 12/2009 | Karabinis | |
| 7,636,546 B2 | 12/2009 | Karabinis | |
| 7,636,566 B2 | 12/2009 | Karabinis | |
| 7,636,567 B2 | 12/2009 | Karabinis et al. | |
| 7,639,981 B2 | 12/2009 | Karabinis | |
| 7,653,348 B2 | 1/2010 | Karabinis | |
| 7,664,460 B2 | 2/2010 | Karabinis et al. | |
| 7,696,924 B2 | 4/2010 | Levin et al. | |
| 7,706,746 B2 | 4/2010 | Karabinis et al. | |
| 7,706,748 B2 | 4/2010 | Dutta | |
| 7,706,826 B2 | 4/2010 | Karabinis | |
| 7,738,837 B2 | 6/2010 | Karabinis | |
| 7,747,229 B2 | 6/2010 | Dutta | |
| 7,751,823 B2 | 7/2010 | Karabinis | |
| 7,756,490 B2 | 7/2010 | Karabinis | |
| 7,783,287 B2 | 8/2010 | Karabinis | |
| 7,792,069 B2 | 9/2010 | Karabinis | |
| 7,792,488 B2 | 9/2010 | Karabinis et al. | |
| 7,796,985 B2 | 9/2010 | Karabinis | |
| 7,796,986 B2 | 9/2010 | Karabinis | |
| 7,801,520 B2 | 9/2010 | Karabinis | |
| 7,813,700 B2 | 10/2010 | Zheng et al. | |
| 7,817,967 B2 | 10/2010 | Karabinis et al. | |
| 7,831,201 B2 | 11/2010 | Karabinis | |
| 7,831,202 B2 | 11/2010 | Karabinis | |
| 7,831,251 B2 | 11/2010 | Karabinis et al. | |
| 7,856,211 B2 | 12/2010 | Karabinis | |
| 7,890,097 B2 | 2/2011 | Karabinis | |
| RE42,261 E | 3/2011 | Karabinis | |
| 7,907,893 B2 | 3/2011 | Karabinis et al. | |
| 7,917,135 B2 | 3/2011 | Karabinis | |
| 2002/0090942 A1 | 7/2002 | Karabinis et al. | |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0149986 A1 | 8/2003 | Mayfield et al. | |
| 2003/0153308 A1 | 8/2003 | Karabinis | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |

| | | |
|---|---|---|
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Karabinis et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040659 A1 | 2/2006 | Karabinis |
| 2006/0094420 A1 | 5/2006 | Karabinis |
| 2006/0135058 A1 | 6/2006 | Karabinis |
| 2006/0135070 A1 | 6/2006 | Karabinis |
| 2006/0165120 A1 | 7/2006 | Karabinis |
| 2006/0194576 A1 | 8/2006 | Karabinis et al. |
| 2006/0205347 A1 | 9/2006 | Karabinis |
| 2006/0205367 A1 | 9/2006 | Karabinis |
| 2006/0211452 A1 | 9/2006 | Karabinis |
| 2006/0246838 A1 | 11/2006 | Karabinis |
| 2006/0252368 A1 | 11/2006 | Karabinis |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0037514 A1 | 2/2007 | Karabinis |
| 2007/0072545 A1 | 3/2007 | Karabinis et al. |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0184849 A1 | 8/2007 | Zheng |
| 2007/0192805 A1 | 8/2007 | Dutta et al. |
| 2007/0202816 A1 | 8/2007 | Zheng |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0042509 A1 | 2/2009 | Karabinis et al. |
| 2009/0075645 A1 | 3/2009 | Karabinis |
| 2009/0088151 A1 | 4/2009 | Karabinis |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0009677 A1 | 1/2010 | Karabinis et al. |
| 2010/0015971 A1 | 1/2010 | Good et al. |
| 2010/0029269 A1 | 2/2010 | Karabinis |
| 2010/0035604 A1 | 2/2010 | Dutta et al. |
| 2010/0035605 A1 | 2/2010 | Karabinis |
| 2010/0035606 A1 | 2/2010 | Karabinis |
| 2010/0039967 A1 | 2/2010 | Karabinis et al. |
| 2010/0041394 A1 | 2/2010 | Karabinis |
| 2010/0041395 A1 | 2/2010 | Karabinis |
| 2010/0041396 A1 | 2/2010 | Karabinis |
| 2010/0048201 A1 | 2/2010 | Karabinis |
| 2010/0054160 A1 | 3/2010 | Karabinis |
| 2010/0120419 A1 | 5/2010 | Zheng et al. |
| 2010/0141509 A1 | 6/2010 | Levin et al. |
| 2010/0184370 A1 | 7/2010 | Zheng et al. |
| 2010/0184381 A1 | 7/2010 | Zheng et al. |
| 2010/0184427 A1 | 7/2010 | Zheng et al. |
| 2010/0190507 A1 | 7/2010 | Karabinis et al. |
| 2010/0203828 A1 | 8/2010 | Zheng |
| 2010/0203884 A1 | 8/2010 | Zheng et al. |
| 2010/0210209 A1 | 8/2010 | Karabinis et al. |
| 2010/0210262 A1 | 8/2010 | Karabinis et al. |
| 2010/0240362 A1 | 9/2010 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 152 629 A1 | 11/2001 |
| EP | 1 193 989 A1 | 4/2002 |
| EP | 1 944 885 A2 | 7/2008 |
| EP | 1 569 363 B1 | 11/2008 |
| JP | 10-191423 | 7/1998 |
| WO | WO 99/30437 | 6/1999 |
| WO | WO 01/54314 A1 | 7/2001 |

OTHER PUBLICATIONS

Del Re, Enrico, "The GSM Procedures in an Integrated Cellular/Satellite System," IEEE Journal on Selected Areas in Communications, vol. 13, No. 2, Feb. 1995, New York, NY, pp. 421-430.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Invitation to Pay Additional Fees, PCT/US2004/031507, Apr. 14, 2005.

Notification of Transmittal of the International Search Report and the Written Opinion of the International Searching Authority, PCT/US2004/031507, Jun. 8, 2005.

Office Action corresponding to Japanese Patent Application No. 2006-528261; Dispatch date: Dec. 10, 2010; 4 pages.

* cited by examiner

SYSTEMS AND METHODS FOR MOBILITY MANAGEMENT IN OVERLAID MOBILE COMMUNICATIONS SYSTEMS

CROSS-REFERENCE TO RELATED APPLICATIONS

This application is a divisional of U.S. patent application Ser. No. 12/960,760, filed Dec. 6, 2010 now U.S. Pat. No. 7,974,619, entitled Systems and Methods for Mobility Management In Overlaid Mobile Communications Systems, which itself is a continuation of U.S. patent application Ser. No. 10/948,606, filed Sep. 23, 2004 now abandoned, entitled Systems and Methods for Mobility Management In Overlaid Mobile Communications Systems, which itself claims the benefit of provisional application No. 60/505,526, filed Sep. 23, 2003, entitled Mobility Management for Hybrid Terrestrial-Satellite Networks, the disclosures of all of which are hereby incorporated herein by reference in their entirety as if set forth fully herein.

BACKGROUND OF THE INVENTION

The present invention relates to wireless communications systems and methods, and more particularly, to mobility management systems and methods for wireless communications.

An aim of hybrid terrestrial-satellite networks may be for the satellite network to provide a ubiquitous coverage overlay for the terrestrial network. However, this may give rise to a number of mobility management challenges that may not be optimally handled by the current state of the art.

Figure 1:
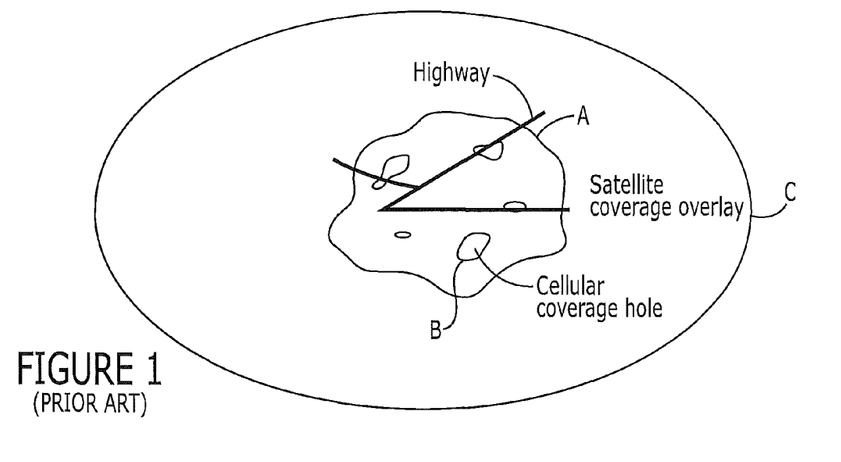
FIG. 1 illustrates exemplary relationships of a satellite mobile communications system overlaid on a terrestrial mobile communications system.

FIG. 1 shows a satellite overlay for a terrestrial network. Three types of regions are identified. A region A is the planned coverage area of the cellular network; typically this will comprise a multiplicity of cell sites and location areas (LAs), served by multiple mobile switching centers (MSCs). "Location area" is a term used in the cellular literature to indicate a collection of cell sites over which paging is performed; an MSC may have several LA's under its jurisdiction. A mobile station (MS) can move about (e.g., change broadcast control channel (BCCH)) within an LA without re-registration, however it typically must re-register when it crosses an LA boundary. This re-registration is called a Location Area Update.

A region C is the planned coverage area of the satellite network, comprising a multiplicity of spotbeams, served by one or more gateways, which act as the satellite equivalent of the MSC. A region B includes holes inside the cellular coverage region A that are also covered by the satellite network. The holes exist mainly in suburban areas and in corridors between urban areas where the population density may not be sufficient for the cellular operator to prioritize the deployment of more base station towers. In dense urban areas, where a substantial amount of traffic is generated, such holes are less common. Note that some holes may be covered by neither network if the satellite view is under heavy blockage.

If the satellite and terrestrial networks are under different administrations, they will typically view each other as different Public Land Mobile Networks (PLMNs) offering "roamable service". If the networks are under the same administration, then the handover typically is performed as between different MSCs, which is known in the present art. Roamable service means that the services have commercial agreements and technical interfaces set up to allow roaming from one network to another. The fact that these networks involve different frequency bands generally is not a technical impediment to roaming, as such roaming already takes place, for example, in GSM between European 900 MHz and North American 1900 MHz bands.

Essentially, once an MS, e.g., a handset, is unable to locate a single forward control-channel carrier (e.g. BCCH carrier in GSM) in the band that it last used, it will start scanning carrier frequencies in alternate bands, like the satellite band. Which bands the MS scans, and in what sequence, is typically determined by a native login application in the MS. Once the MS finds a suitable forward control-channel carrier, it will camp on that carrier and control channel. Camping may include synchronization to the carrier and control channel, and registering to the network for service. Pages for incoming calls to the MS will be sent on the camped-on forward control channel.

The roaming approach described above may be adequate when the MS moves from the cellular coverage region A to the satellite coverage regions C in the idle mode, as it is a quasi-permanent change in the serving network for the MS and very rapid network change may not be necessary. However, there may be at least two cases when a very rapid change in the serving network, and/or a change in network without explicit registration may be desirable.

FIG. 1 shows a highway passing through a number of holes B in the cellular coverage area A. A large number of MS's might be passing through the holes B in idle mode and with no need for satellite communications. However, as each of the MS's may be programmed to roam to the satellite network if the terrestrial service is unavailable, each MS, as it passes through the hole, may attempt to perform an inter-PLMN roam, involving a Location Area Update and Registration. This could create a huge and unnecessary burden on the satellite resources of power and bandwidth, which may be unnecessary, as most of the MS's may not need to use the satellite network.

If an MS were moving from the cellular coverage region A to a hole B or the satellite coverage region C (i.e., any region where there is no cellular coverage) while it was engaged in a call, the call, typically, would be dropped. Call dropping is generally considered a very negative user experience in cellular services and, if the user has been told that there is a satellite coverage-overlay, he may expect the same seamless service as in cellular. After being dropped, the MS (if it stayed sufficiently long in the new region) would typically roam to the satellite network and camp on to a satellite forward control channel. As the mobile re-entered the cellular network it would typically roam back again to the cellular network, which again could involve a significant period of service unavailability for the user. This means that when the MS is in the satellite network, it may periodically search for cellular control-channel carriers and roam to these, if available. This searching may be performed by a variety of means described in the present art, including adjacent cell monitoring as in GSM.

SUMMARY OF THE INVENTION

According to some embodiments of the present invention, communications of a mobile station with a satellite mobile communications system and a terrestrial mobile communications system are coordinated. The mobile station is registered with the terrestrial mobile communications system and, responsive to the registration of the mobile station with the terrestrial mobile communications system, the mobile station is concurrently registered with the satellite mobile communications system. In some embodiments, the concurrent registration includes implicitly registering the mobile station with the satellite mobile communications system. For example, information identifying the mobile station may be stored in a location register of the satellite mobile communications system responsive to the registration of the mobile station with the terrestrial mobile communications system, e.g., by transfer from a location register of the terrestrial mobile communications system. Implicit registration may be achieved without performing a location update for the mobile station in the satellite mobile communications system, and may be terminated responsive to passage of a predetermined interval without a location update for the terminal.

In further embodiments of the present invention, concurrent registration of the mobile station with the satellite mobile communications system may include explicitly registering the mobile station with the satellite mobile communications system responsive to the registration of the mobile station with the terrestrial mobile communications system. For example, explicit registration of the mobile station with the satellite mobile communications system may include initiating a registration request from the mobile station to the satellite mobile communications system responsive to the registration of the mobile station with the terrestrial mobile communications system without detecting a loss of communications between the mobile station and the terrestrial mobile communications system.

Some embodiments of the invention involve synchronizing the registration and the location data of the MS in the terrestrial and satellite networks through a link between the home location registers of the two network. In other embodiments, this synchronization may be performed by the MS unilaterally leaving the terrestrial network when it detects that the beam identifier of a forward control channel of the satellite network has changed and performing a location update. It is noteworthy that the MS is always aware of the beam identifier of the satellite network as it always monitors the satellite control channels as an "adjacent cell" of the terrestrial network.

According to further aspects of the present invention, authentication tokens may be pre-generated for quick registration with a satellite mobile communications system. Respective copies of a set of authentication tokens are generated at respective ones of the mobile station and the satellite mobile communications system. Successive registrations of the mobile station with the satellite mobile communications system are then performed using successive ones of the authentication tokens. Re-registration of the mobile station with the satellite mobile communications system may occur without retrieving additional security data from the terrestrial mobile communications system.

According to further embodiments of the present invention, communications of a mobile station with first and second overlaid mobile communications systems are coordinated. The mobile station is registered with the first mobile communications system and, responsive to the registration of the mobile station with the first mobile communications system, the mobile station is concurrently registered with the second mobile communications system. For example, the mobile station may be implicitly registered with the second mobile communications system responsive to the registration of the mobile station with the first mobile communications system.

In further embodiments of the present invention, a mobile communications system includes a satellite mobile communications system that supports registration of a mobile station therewith concurrent with registration of the mobile terminal with a terrestrial mobile communications system. The satellite mobile communication system may be operative to implicitly register the mobile station therewith responsive to registration of the mobile station with the terrestrial mobile communications system. For example, the satellite mobile communications system may be operative to store information identifying the mobile station in a location register thereof responsive to the registration of the mobile station with the terrestrial mobile communications system.

In still further embodiments of the present invention, a mobile communications system includes a satellite mobile communications system that supports generation of respective copies of a set of authentication tokens at respective ones of a mobile station and the satellite mobile communications system and that is further operative to subsequently accept successive registrations of the mobile station with the satellite mobile communications system using successive ones of the authentication tokens. The satellite mobile communications system may be operative to receive security data for the mobile station from a terrestrial mobile communications system and to generate the copy of the set of authentication tokens from the received security data.

In additional embodiments of the present invention, a mobile communications system includes a terrestrial mobile communications system that supports registration of a mobile station therewith concurrent with registration of the mobile terminal with a satellite mobile communications system. The terrestrial mobile communication system may support implicit registration of the mobile station with the satellite mobile communications system responsive to registration of the mobile station with the terrestrial mobile communications system, and may include means for transferring information identifying the mobile station from a location register of the terrestrial mobile communications system to a location register of the satellite mobile communications system.

DETAILED DESCRIPTION OF EXEMPLARY EMBODIMENTS

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As discussed above, certain mobility management problems in hybrid satellite-terrestrial networks may not be optimally addressed by current state of the art. Two examples are: (a) dual-mode (terrestrial-satellite) mobiles, passing through a coverage hole in a cellular coverage area as a result, for example, of the hole straddling a major highway, will likely want to register to the satellite network, regardless of whether they will use the satellite network—this can create a large and unnecessary burden on the satellite network; and (b) if it is advertised that the satellite network provides a ubiquitous coverage-overlay for the cellular network, then the user may likely expect seamless, in-call handover between the cellular and satellite network when the user leaves the cellular network. If the cellular and satellite networks are owned by different administrations, this may require inter-PLMN handover. If the satellite and terrestrial home PLMN are owned by the same administration, the handover may be performed as an inter-MSC handover, whose procedure is known in the prior art. However, if the user roams from the home terrestrial PLMN to a visited terrestrial PLMN and then to the satellite network, then inter-PLMN handover (between the visited terrestrial PLMN and the satellite network) may still be required if the satellite coverage overlay guarantee is to be offered to the user at all times. Some embodiments of the invention described herein that may provide solutions to such problems include: (a) dual registration in the satellite and terrestrial home PLMN, using a single subscriber identification module (SIM); (b) implicit registration in the satellite network without loading the latter; (c) location updates in the satellite network while the MS is in-coverage in the terrestrial network and/or (d) rapid authentication using temporary, "speedpass-type" authentication tokens of different security levels.

Figure 2:
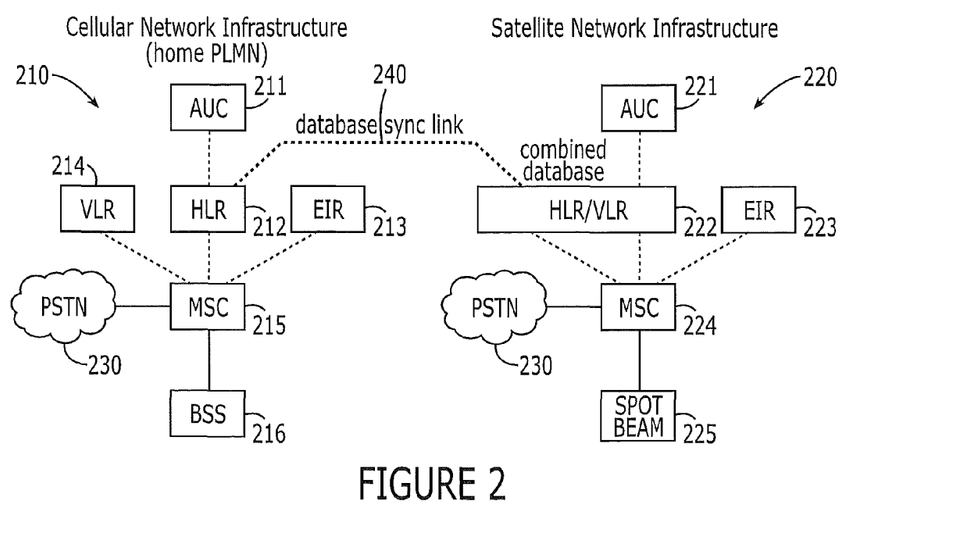
FIG. 2 illustrates apparatus and operations for location database synchronization between a terrestrial mobile communications system and a satellite mobile communications system to support dual registration according to some embodiments of the present invention.

A possible solution to the above-described problems according to some embodiments of the present invention involves implicit registration, whereby the satellite knows the MSs location via, for example, home location register (HLR) synchronization with the cellular network, without the need for explicit registration by the MS. The MS is implicitly registered in the satellite network by being explicitly registered in the cellular network. This means that MS will be considered an implicit roamer to the satellite network (i.e., that it has a virtual presence in the satellite network), even though it may actually (physically) be in any arbitrary cellular network (either the home PLMN or another PLMN where it is roaming) In order to be considered a "roamer" to the satellite network, the latter preferably knows in which spot beam the MS is currently located. A database synchronizing link may be established between the HLR of the cellular network and a combined visited location register (VLR)/HLR of the satellite network An exemplary implementation of such synchronization according to some embodiments of the present invention is illustrated in FIG. 2. A terrestrial PLMN 210 includes a base station subsystem (BSS) 216 that communicates with MS's under control of an MSC 215 that is coupled to a public switched telephone network (PSTN) 230. Associated with the MSC 215 are various components that store information for access to and control of the network 210. These include a home location register (HLR) 212 that serves as the main database of permanent subscriber information for the network 210. Typically maintained by the subscriber's home carrier (or the network operator where the user initiated the call), the HLR 212 typically contains pertinent user information, including address, account status, and preferences. A visited location register (VLR) 214 maintains temporary user information (such as current location) to manage requests from subscribers who are out of the area covered by their home system. Confidential keys for user authentication are stored in an authentication center (AUC) 211, and serial numbers of valid mobile equipment are stored in an equipment identify register (EIR) 213.

Similar components are present in an exemplary satellite mobile communications network 220. The satellite mobile communications network 220 includes a satellite spotbeam 225, which functions much like a BSS of a terrestrial network, and an MSC 224, which may be included in or operatively associated with a satellite gateway that communicates with the satellite that supports the spotbeam 225. A combined VLR/HLR 222 is associated with the MSC 224, along with an AUC 221 and an EIR 223. In the satellite mobile communications network 220, the HLR and VLR functions may be combined into one database when there is a single satellite gateway, as all spotbeams, or satellite cells, may be visible from the gateway. Otherwise, the architecture may be identical to the case of the cellular infrastructure.

A synchronization link 240 links the HLR 212 of the PLMN 210 with the satellite network VLR/HLR 222. Using the above synchronization link 240, the satellite mobile communications network 220 can be aware of the approximate location of the MS relative to spotbeam coverage patterns. If the latter goes into a cellular coverage hole, and it can still receive a strong satellite carrier (e.g., forward control channel), it can synchronize to that carrier and control channel as a normal roaming operation, but without performing the location area update that would normally be performed in an inter-PLMN roaming operation. This can reduce communications with the satellite mobile communications network 220, the motivation for which was explained above. The MS is now ready to receive pages on the satellite mobile communications network 220.

When there is an incoming call for the MS, the home cellular MSC 215, which may think that the mobile is still in the coverage area of a terrestrial MSC (the one that is supposed to cover the hole), may try to page the MS in the expected LA. After the normal number of tries, the MSC 215, according to typical conventional techniques, may declare the MS unavailable. In some embodiments of the present invention, the call can be handed over to the satellite gateway MSC 224, which can page the mobile in the spotbeam 225 that covers the last reported position of the MS (as per the last Location Area Update, which is captured in the HLR of the native cellular network and communicated to the satellite gateway via the synchronization link) The MS can also make outgoing calls in the usual way—for all practical purposes, the MS can be considered registered in the satellite mobile communications network 220.

When the mobile senses a readable cellular carrier again, it can roam back to the terrestrial cellular network 210 and perform a location area update (i.e. reregister). This may be necessary, because the cellular MSC 215 may have marked the MS as detached, which it may do if the MS does not perform a location update at periodic intervals. The satellite mobile communications network 220 does not need to be informed of the transfer.

After entering the implicit registration phase, the MS starts a timer. If the MS does not sense a cellular carrier within a predetermined time period, it means that it is either in a satellite coverage area or it is quasi-static. In either case, an explicit registration to the satellite network can be performed. Indefinite implicit registration may not be desirable for the same reason that periodic location area updates are performed in existing cellular networks, i.e., if the MS abruptly goes into blockage and moves, then there may be an LA change with no knowledge of the network (e.g., this scenario may occur when the MS enters a tunnel or is put inside a shielded briefcase and moved).

Another potential problem with inter-PLMN handover is that registration typically is required. For example, it typically is required, for security and commercial reasons, for an MS entering a new PLMN to register, but current registration processes often take too long to be included as a part of the handover process. Therefore, some embodiments of the invention include rapid authentication during handover, which may be combined with the above described multiple concurrent registration.

Figure 3:
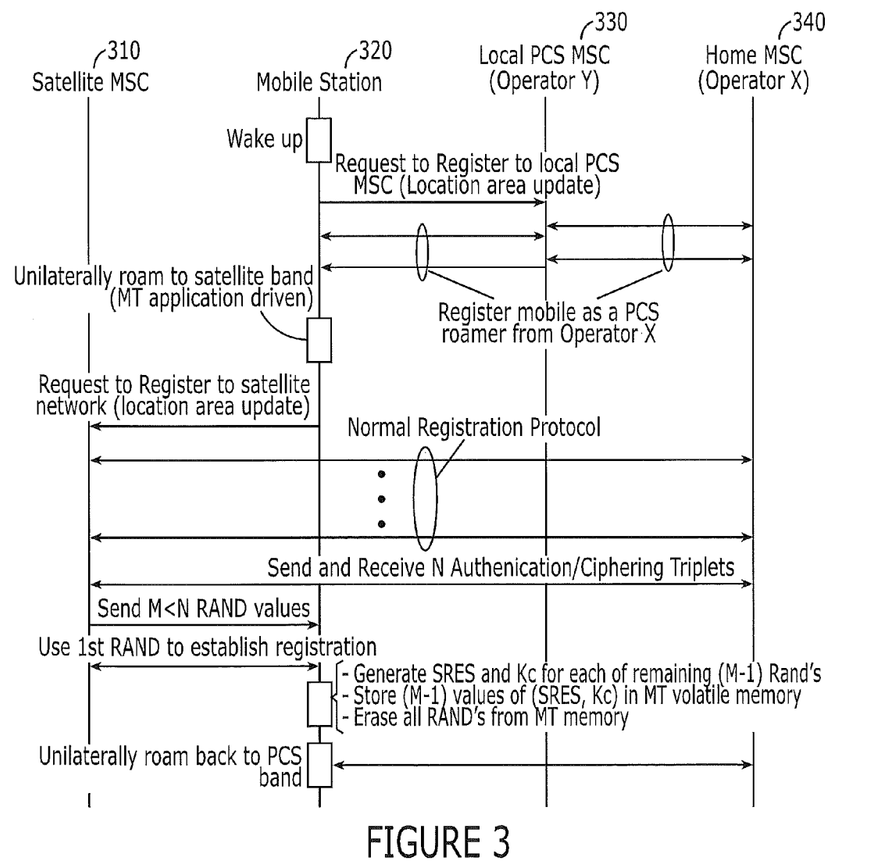
FIGS. 3 and 4 illustrate apparatus and operations for streamlined registration in a satellite communications system according to further embodiments of the present invention.

An exemplary process according to some embodiments of the present invention is illustrated in FIG. 3. Upon first switching on, an MS 320 registers to the locally available MSC 330 of a terrestrial PLMN. This may be the home PLMN of the MS or another PLMN that it has roamed to. The process of registration involves authentication. In GSM, for example, this is based on the mobile being sent a random number, which it digitally signs (encrypts) with a secret, symmetric key carried in a subscriber identification module (SIM). A copy of this key resides in the HLR and is tied to the subscription, identified by the international mobile subscriber identification (IMSI). The signed object SRES is returned by the MS 320 to the local MSC 330. The latter has already requested and received a copy of the true signature from the home PLMN; the local PLMN checks the two signatures and admits the MS 320 to the network if they match.

After it is registered to the local terrestrial PLMN, the MS 320 unilaterally leaves the local terrestrial PLMN and roams to the satellite network. Note that this may be driven by a native application in the MS, e.g., an application that determines the MS's logon process, and need not be constrained by any communications protocol or standard. In some embodiments, the MS 320 may continually monitor the satellite carriers as one of the adjacent cells. Hence, roaming to the satellite network can be a relatively quick operation, as scanning of a frequency list need not be involved. The MS 320 may be registered in the usual way.

The MS 320 may include an LA update upon initial registration. Operation may be limited to this one initial LA update if, for example, synchronization of location registers of the satellite and terrestrial systems is provided. In some embodiments, however, the MS 320 may periodically return to the satellite network to provide LA updates, rather than relying on synchronization of location information between the networks. For example, the MS 320 may roam to the satellite network and provide a location update each time the MS 320 detects a satellite beam identification change. Such an approach may, for example, avoid configuration changes and other potential problems that may be associated with location register synchronization between terrestrial and satellite network databases, without introducing an undue amount of message overhead, as such cell changes in the satellite network would likely occur at a lower rate than cell changes in the terrestrial system. It may be noted that the MS 320 preferably will be aware of the overlaying satellite beam ID as it operates in the terrestrial network, as the MS 320 may need to roam to it if there is a hole in the terrestrial coverage. Therefore, monitoring of satellite beam changes may not introduce a burden on the MS 320.

In addition to these procedures, FIG. 3 illustrates some additional steps that may be introduced to provide a streamlined authentication procedure. When the MS roams to it, a satellite gateway MSC 310 may request security data, e.g., a plurality, N (N>1), of GSM "triplets," from the home MSC 340. These triplets may include the following: (a) a random number RAND; (b) the true value of the signed response SRES, using the same secret key that is in the SIM of the MS 320 and the above RAND; and (c) the cipher key, $K_c$, that is to be used for the link encryption. Of the N triplets, M (<N) are sent to the MS 320 by the satellite gateway 310. Note that this is a departure from normal GSM practice, in which only one triplet is sent to an MS per registration session, although it is acceptable for the visited MSC to request more than one triplet from the home MSC. The MS 320 uses the first triplet for registration in the conventional way. The MS 320 also pre-calculates (M−1) signed response values SRES and stores them, along with (M−1) key values $K_c$, in a moderately secure part of the MS 320 volatile memory in a push-down stack architecture. The use of identical push-down stacks at the MS 320 and the satellite MSC 310 ensures that the records in the two stacks are synchronized. To further guarantee record synchronization, an index field may be included in the record at both locations; that is, in addition to SRES and the $K_c$, a record index is also stored. The security may be software controlled and need not be based on tamper resistant hardware (as is the memory where the secret key is stored in the SIM). Higher security can increase MS cost and may not be warranted by the present security risk; however, neither are such higher security measures precluded by the present scheme.

After registering in the satellite network, the MS 320, once again moves unilaterally back to the local terrestrial network, registering again to the local MSC 330, e.g., by performing a location update. Thereafter, the MS 320 behaves as a normal MS, except in embodiments lacking HLR synchronization, where it may temporarily leave the terrestrial network to perform a location update on the satellite network, as described above, and thereafter return to the terrestrial network.

When a rapid transfer to the satellite network is required, the MS fetches a signed response value SRES and a key value $K_c$, from the top of the pushdown stack and uses them. The retrieved $K_c$ is used for encryption and the pre-computed signed value SRES is used as a "speed-pass" (authentication token) that is passed to the satellite network to achieve rapid authentication. If a record index is used, it is unencrypted, along with the TMSI, to allow rapid location of the record at the satellite gateway MSC.

Figure 4:
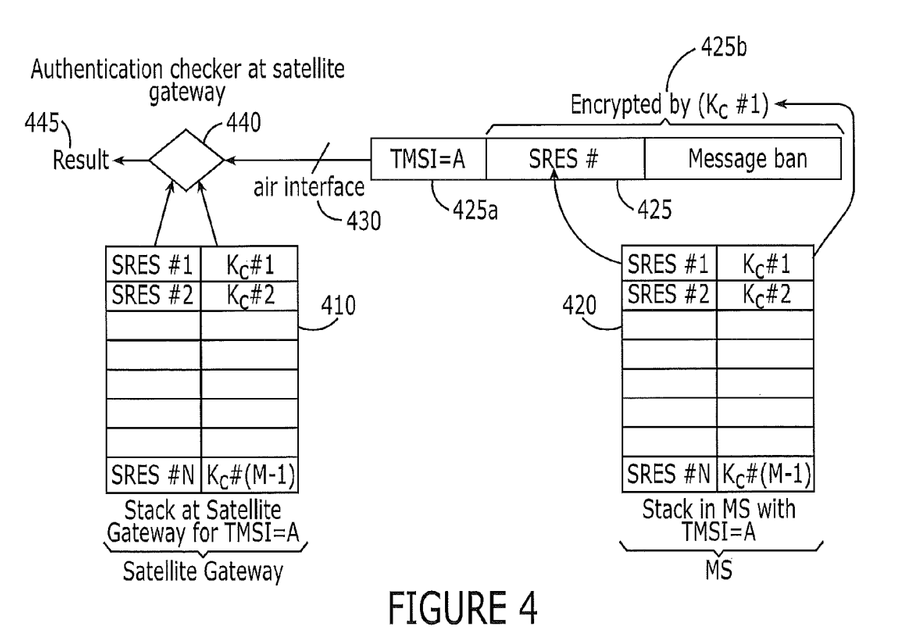

An exemplary rapid authentication process according to further embodiments of the present invention is illustrated in FIG. 4. A payload of an over the air request_for_handover message 425 from the MS 320 to the satellite network MSC 310, illustrated in FIG. 3, may include an unencrypted field 425a that has the Temporary Mobile Station Identification (TMSI) given to the MS 320 during the last time it was at the satellite network. Optionally, the unencrypted part of the message may also include an index field (not shown in FIG. 4). If low security suffices, then this may be all that is required to authenticate the MS 320, and the procedure described above regarding creating and storing multiple SRES values in the MS may be unnecessary. However, for greater security, the TMSI may be followed, in an encrypted part 425b of the payload, by the signed response SRES, which is checked by the satellite network. The satellite network retains a copy 410 of the stack 420 of authentication tokens carried by the MS 320, and values may be discarded after one use, such that there is no uncertainty about which pair of signed response SRES and key $K_c$, values is in use for a given access by the MS 320. Before the stack is exhausted, it may be replenished by another set of signed response SRES, and key $K_c$, values. Alternatively, the set may be recycled (i.e., the stack values are not discarded but saved in a backup stack), but this may reduce security. Note that the satellite gateway may carry a stack of signed response SRES and key $K_c$, values for each MS that has performed implicit registration with it.

An even higher security approach, according to further embodiments of the invention, is to store not the pre-calculated signed responsive SRES values, but the random number RAND values. The signed response SRES values are calculated, fresh and on demand, at the time of fast authentication. However, the time to calculate SRES is then added to the authentication time and may be a price for the added security. It is expected that the time to calculate SRES by symmetric encryption is of the order of 100 ms.

In the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A method of coordinating communications of a mobile station with a satellite mobile communications system, the method comprising:

generating respective copies of a set of authentication tokens at respective ones of the mobile station and the satellite mobile communications system; and then performing successive registrations of the mobile station with the satellite mobile communications system using successive ones of the authentication tokens;

wherein performing successive registrations of the mobile station with the satellite mobile communications system using successive ones of the authentication tokens comprises:

registering the mobile station with the satellite mobile communications system using a first one of the authentication tokens;

establishing communications between the mobile station and a terrestrial mobile communications system;

re-establishing communications between the mobile station and the satellite mobile communications system; and re-registering the mobile station with the satellite mobile communications system using a second one of the authentication tokens;

the method further comprising:

communicating security data for the mobile station from the terrestrial mobile communications system to the satellite mobile communications system, and wherein generating respective copies of a set of authentication tokens at respective ones of the mobile station and the satellite mobile communications system comprises generating the respective copies of the set of authentication tokens at respective ones of the mobile station and the satellite mobile communications system from the communicated security data;

communicating new security data from the terrestrial mobile communications system to the satellite mobile communications system responsive to detecting that a predetermined number of the previously generated authentication tokens have been used; and generating respective copies of a new authentication token at respective ones of the mobile station and the satellite mobile communications system from the communicated new security data.

2. A method according to claim 1, wherein each of the successive registrations of the mobile station with the satellite mobile communications system comprises:

communicating an authentication token from the mobile station to the satellite mobile communications system; and determining whether the communicated authentication token matches an authentication token generated by the satellite mobile communications system.

3. A method according to claim 1, wherein re-registering the mobile station with the satellite mobile communications system using a second one of authentication tokens comprises re-registering the mobile station with the satellite mobile communications system without retrieving additional security data from the terrestrial mobile communications system.

4. A method according to claim 1, wherein the communicated security data comprises a plurality of triplets, each including a random number, an encrypted value generated from the random number according to a key associated with a subscriber, and a cipher key, and wherein generating respective copies of a set of authentication tokens at respective ones of the mobile station and the satellite mobile communications system from the communicated security data comprises:

communicating the random numbers from the satellite mobile communications system to the mobile station; and generating matching triplets at the mobile station from the communicated random numbers.

5. A mobile communications system, comprising:

a satellite mobile communications system that supports generation of respective copies of a set of authentication tokens at respective ones of a mobile station and the satellite mobile communications system and that is further operative to subsequently accept successive registrations of the mobile station with the satellite mobile communications system using successive ones of the authentication tokens;

wherein the satellite mobile communications system is operative to receive security data for the mobile station from a terrestrial mobile communications system and to generate the copy of the set of authentication tokens from the received security data; and wherein the satellite mobile communications system is further operative to receive new security data from the terrestrial mobile communications system responsive to detecting that a predetermined number of the previously generated authentication tokens have been used and to generate a copy of a new authentication token from the received new security data.

6. A system according to claim 5, wherein the satellite mobile communications system is further operative to transfer at least a portion of the received security data to the mobile terminal to support generation of the copy of the set of authentication tokens at the mobile station.

7. A system according to claim 5, wherein the satellite mobile communications system is operative to re-register the mobile station therewith out retrieving additional security data from the terrestrial mobile communications system.

8. A system according to claim 5, wherein the received security data comprises a plurality of triplets, each including a random number, an encrypted value generated from the random number according to a key associated with a subscriber, and a cipher key.

9. A system according to claim 5, wherein the satellite mobile communications system is further operative to transfer at least a portion of the received new security data to the mobile terminal to support generation of a copy of the new authentication token at the mobile station.

10. A method performed by a mobile station to coordinate communications of the mobile station with a satellite mobile communications system, the method comprising:
providing a set of authentication tokens; and then
performing successive registrations of the mobile station with the satellite mobile communications system using successive ones of the authentication tokens;
wherein performing successive registrations of the mobile station with the satellite mobile communications system using successive ones of the authentication tokens comprises:
registering the mobile station with the satellite mobile communications system using a first one of the authentication tokens;
establishing communications between the mobile station and a terrestrial mobile communications system;
re-establishing communications between the mobile station and the satellite mobile communications system; and
re-registering the mobile station with the satellite mobile communications system using a second one of the authentication tokens;
the method further comprising:
receiving security data for the mobile station from the satellite mobile communications system, and wherein providing a set of authentication tokens comprises generating the set of authentication tokens at the mobile station from the communicated security data;
receiving new security data for the mobile station responsive to detecting that a predetermined number of the previously generated authentication tokens have been used; and
generating a new authentication token at the mobile station from the communicated new security data.

11. A method according to claim 10, wherein each of the successive registrations of the mobile station with the satellite mobile communications system comprises:
communicating an authentication token from the mobile station to the satellite mobile communications system; and
determining whether the communicated authentication token matches an authentication token generated by the satellite mobile communications system.

12. A method performed by a satellite mobile communications system to coordinate communications of a mobile station with the satellite mobile communications system, the method comprising:
generating a set of authentication tokens at the satellite mobile communications system; and then
performing successive registrations of the mobile station with the satellite mobile communications system using successive ones of the authentication tokens;
wherein performing successive registrations of the mobile station with the satellite mobile communications system using successive ones of the authentication tokens comprises:
registering the mobile station with the satellite mobile communications system using a first one of the authentication tokens; and
re-registering the mobile station with the satellite mobile communications system using a second one of the authentication tokens;
the method further comprising:
receiving security data for the mobile station from the terrestrial mobile communications system at the satellite mobile communications system, and wherein generating a set of authentication tokens at the satellite mobile communications system comprises generating the set of authentication tokens at the satellite mobile communications system from the communicated security data;
receiving new security data from the terrestrial mobile communications system at the satellite mobile communications system responsive to detecting that a predetermined number of the previously generated authentication tokens have been used; and
generating a new authentication token at the satellite mobile communications system from the communicated new security data.

13. A method according to claim 12, wherein each of the successive registrations of the mobile station with the satellite mobile communications system comprises:
receiving an authentication token from the mobile station at the satellite mobile communications system; and
determining whether the communicated authentication token matches an authentication token generated by the satellite mobile communications system.

14. A mobile communications device, comprising:
a mobile station that includes a set of authentication tokens and that is operative to successively register with the satellite mobile communications system using successive ones of the authentication tokens from the set of authentication tokens;
wherein the mobile station is operative to receive security data from a terrestrial mobile communications system and to generate the copy of the set of authentication tokens from the received security data; and
wherein the mobile station is further operative to receive new security data from the terrestrial mobile communications system responsive to detecting that a predetermined number of the previously generated authentication tokens have been used and to generate a copy of a new authentication token from the received new security data.

15. A device according to claim 14, wherein the mobile station is further operative to receive security data from the satellite mobile communications system and to generate the set of authentication tokens at the mobile station from the security data.

16. A device according to claim 15, wherein the security data comprises a plurality of triplets, each including a random number, an encrypted value generated from the random number according to a key associated with a subscriber, and a cipher key.

* * * * *

UNITED STATES PATENT AND TRADEMARK OFFICE
CERTIFICATE OF CORRECTION

PATENT NO. : 8,131,293 B2 Page 1 of 1
APPLICATION NO. : 13/102718
DATED : March 6, 2012
INVENTOR(S) : Dutta It is certified that error appears in the above-identified patent and that said Letters Patent is hereby corrected as shown below:

In the Claims:
Column 11, Claim 7, Line 6: Please correct "therewith out"
to read -- therewith without --

Signed and Sealed this
Twelfth Day of June, 2012

David J. Kappos
*Director of the United States Patent and Trademark Office*